(12) United States Patent
Del Fabro (10) Patent No.: US 10,625,332 B2
(45) Date of Patent: Apr. 21, 2020

(54) APPARATUS AND METHOD FOR HANDLING METAL PRODUCTS

(71) Applicant: M.E.P. Macchine Elettroniche Piegatrici S.P.A., Reana del Rojale (IT)

(72) Inventor: Giorgio Del Fabro, Udine (IT)

(73) Assignee: M.E.P. MACCHINE ELETTRONICHE PIEGATRICI S.P.A., Reana del Rojale (IT)

(*) Notice: Subject to any disclaimer, the term of this patent is extended or adjusted under 35 U.S.C. 154(b) by 0 days.

(21) Appl. No.: 16/309,286

(22) PCT Filed: Jun. 12, 2017

(86) PCT No.: PCT/EP2017/064239
§ 371 (c)(1),
(2) Date: Dec. 12, 2018

(87) PCT Pub. No.: WO2017/216085
PCT Pub. Date: Dec. 21, 2017

(65) Prior Publication Data
US 2019/0314886 A1 Oct. 17, 2019

(30) Foreign Application Priority Data
Jun. 13, 2016 (IT) .......................... 102016000060494

(51) Int. Cl.
*B21F 27/10* (2006.01)
*B21D 43/00* (2006.01)
(Continued)

(52) U.S. Cl.
CPC ............ *B21F 27/10* (2013.01); *B21D 43/006* (2013.01); *B21F 23/005* (2013.01); *B65G 15/12* (2013.01);
(Continued)

(58) Field of Classification Search
CPC ...... B21F 23/007; B21F 23/005; B21F 27/10; B21D 43/006; B65G 25/00; B65G 25/04;
(Continued)

(56) References Cited

U.S. PATENT DOCUMENTS 3,596,551 A   8/1971 Lyamets
2006/0182614 A1* 8/2006 Roesch .................. B65B 17/02
                                                                  414/793

(Continued)

FOREIGN PATENT DOCUMENTS

EP   1375022 A2   1/2004
EP   1736276 A1   12/2006
(Continued)

OTHER PUBLICATIONS

Int'l Search Report and Written Opinion dated Aug. 9, 2017 in Int'l Application No. PCT/EP2017/064239.

*Primary Examiner* — Mark A Deuble
(74) *Attorney, Agent, or Firm* — Panitch Schwarze Belisario & Nadel LLP (57) ABSTRACT

A handling apparatus including a support plane configured to support a plurality of metal products with an oblong development, and handling devices configured to pick up a metal product from a pick-up zone of the support plane and to deliver it to a delivery zone. Movement devices are associated with the support plane configured to distribute the metal products on the support plane and to move them toward the pick-up zone. The handling devices comprise a plurality of transfer arms provided with magnetic holding elements in order to magnetically hold one of the metal products.

10 Claims, 4 Drawing Sheets

(51) Int. Cl.
*B21F 23/00* (2006.01)
*B65G 15/12* (2006.01)
*B65G 47/82* (2006.01)

(52) U.S. Cl.
CPC ...... *B65G 47/82* (2013.01); *B65G 2201/0276* (2013.01)

(58) Field of Classification Search
CPC ........ B65G 29/00; B65G 47/82; B65G 47/32; B65G 47/1485; B65G 47/92; B65G 47/848; B65G 15/10; B65G 15/105; B65G 15/12; B65G 2201/0276
See application file for complete search history.

(56) References Cited

U.S. PATENT DOCUMENTS

| | | | | |
|---|---|---|---|---|
| 2008/0199296 A1* | 8/2008 | Ghosh | ............... | B65G 57/183 414/794.8 |
| 2009/0007621 A1* | 1/2009 | Del Fabro | ........... | B21D 43/006 72/421 |
| 2009/0191041 A1* | 7/2009 | Del Fabro | ............ | B21F 23/005 414/745.1 |
| 2012/0155998 A1* | 6/2012 | Verroeye | ............. | B65G 47/902 414/618 |
| 2017/0144846 A1* | 5/2017 | Vielhaber | ............. | B65G 57/18 |

FOREIGN PATENT DOCUMENTS

| | | | | |
|---|---|---|---|---|
| FR | 2246477 A1 | | 5/1975 | |
| JP | S57189924 A | | 11/1982 | |
| JP | H06-166429 A | | 6/1994 | |
| WO | WO-2016132316 A1 * | | 8/2016 | ........... B21D 43/006 |

* cited by examiner fig. 1 fig. 2 fig. 3 fig. 4 fig. 5 fig. 6 fig. 7

APPARATUS AND METHOD FOR HANDLING METAL PRODUCTS

CROSS-REFERENCE TO RELATED APPLICATION

This application is a Section 371 of International Application No. PCT/EP2017/064239, filed Jun. 12, 2017, which was published in the English language on Dec. 21, 2017, under International Publication No. WO 2017/216085 A1, which claims priority under 35 U.S.C. § 119(b) to Italian Application No. 102016000060494, filed Jun. 13, 2016, the disclosures of which are incorporated herein by reference in their entirety.

FIELD OF THE INVENTION

The present invention concerns an apparatus for handling metal products with an oblong configuration, such as rods, reinforcement wires, round or square bars or suchlike.

The present invention can be used to divide a metal product from a bundle and to load the metal product into a work machine such as a bending machine, a curving machine, a stirrup-making machine or a welding machine.

BACKGROUND OF THE INVENTION

Machines for working metal products are known, which work one or more products at a time.

Such work machines are served by stores where bundles of products are disposed and from which the products to be loaded to the work machine are picked up on each occasion.

The operation of picking up and extracting individual products from the bundle is often very difficult since the oblong products, which can reach even 12 meters and more in length, arrive loose, tangled and twisted with each other.

The pick-up and loading operation of the work machine is performed manually by an operator, from whom a great effort is required, with risks for his safety and slowdowns in the operating cycle, thus reducing the productivity of subsequent processes.

There are also known apparatuses for handling metal products comprising magnetic lifting means which, by magnetic action, lift a plurality of products from a bundle, taking them by their centerline or at one end thereof.

The remaining part of the metal product, which normally remains tangled in the bundle, is subsequently and progressively extracted with extractor means.

Due to the great effort required to extract the metal product from the bundle, the metal product can be deformed irregularly with respect to its rectilinear extension, compromising the final geometry of the bent product.

Furthermore, another disadvantage of such handling devices is that a great effort is required to completely extract the metal product from the bundle, and long cycle times and complex and expensive equipment are also required.

Further examples of handling apparatuses for metal products such as reinforcement bars are described in documents JP-A-H06.1664429, EP-A-1.375.022, JP-A-S57.189924, FR-A-2.246.477, U.S. Pat. No. 3,596,551, and EP-A-1,736, 276 which, however, are not able to ensure that the metal products arriving from a bundle are picked up separately.

In fact, the particular conformation of the handling apparatuses described in these documents makes it extremely complex to pick up the metal products precisely because of the great length and overlap to which the bars are subjected when wound in a bundle.

In these known solutions, it is particularly complex to avoid overlapping the metal products in order to prevent their subsequent removal in groups.

Furthermore, picking up the metal products with the devices described in the patent documents described above is particularly ineffective since the gripping devices do not guarantee the grip of a single metal product.

One purpose of the present invention is to obtain a handling apparatus for at least one metal product from the bundle which automates the extraction activity without requiring the intervention of operators, which is simple, cheap, requires little or no maintenance and reduced initial investment.

Another purpose of the present invention is to obtain a handling apparatus which allows to extract the metal products from the bundle without excessive effort and with reduced cycle times.

Another purpose of the present invention is to pick up and load metal products into a work machine, preventing the metal products from being deformed.

Another purpose is to perfect a method for automatically loading at least one metal product from a bundle of products and making them available to a work machine.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a handling apparatus, according to the present invention, comprises a support plane configured to support a plurality of metal products with an oblong development, and handling devices configured to pick up a metal product from a pick-up zone of the support plane and to deliver it to a delivery zone.

According to one aspect of the present invention, movement devices are associated with the support plane configured to distribute the metal products on the support plane and to move them toward the pick-up zone.

According to another aspect of the present invention, the handling devices comprise a plurality of transfer arms each provided with a first end around which the transfer arm is made to alternately rotate, and with a second end with which a respective magnetic holding element is associated to magnetically hold one of the metal products. The transfer arms are alternately mobile between the pick-up zone and the delivery zone.

According to another aspect of the invention, the support plane, in the pick-up zone, is provided with at least one magnetic body configured to hold at least one of the metal products adherent to the support plane. The second end of the transfer arm is provided with a housing seating in which the magnetic holding element is installed, and with an abutment edge facing toward the housing seating and facing the support plane when the transfer arm is located in the pick-up zone. Each abutment edge defines with the pick-up zone a respective reception cavity for one of the metal products received from the movement devices.

This solution allows to obtain an extremely efficient handling apparatus able to reciprocally separate the metal products on the support plane in order to supply them, already divided, to a pick-up zone for their subsequent transfer to the delivery zone. Moreover, the present invention allows to separate individually the metal products at each handling, in order to supply them one at a time to the delivery zone. Indeed, the particular configuration of the handling apparatus allows to prevent blockages during the transfer of the metal products, since it prevents a loss of the grip thanks to a sure hold exerted by the magnetic holding elements. The particular conformation of the reception cavity that is defined when the transfer arms are in the pick-up zone also allows to prevent overlapping metal products from both being held by the magnetic holding elements. Moreover, the magnetic body located in the pick-up zone interacts with the particular shape of the reception cavity to keep the metal product in the pick-up zone adherent with the support plane. This ensures the sure and unequivocal insertion of the metal product inside the reception cavity.

The present invention also concerns a method for handling metal products.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Embodiments of the present invention concern a handling apparatus for metal products P, indicated in its entirety by the reference number 10.

The metal products P have a mainly oblong development and, after handling by the handling apparatus 10 according to the present invention, can be subjected to processes such as bending, curving, stirrup-making or welding.

The handling apparatus 10 according to the present invention comprises at least one support plane 11 configured to support a plurality of metal products P, for example a bundle of metal products P.

Figure 1:
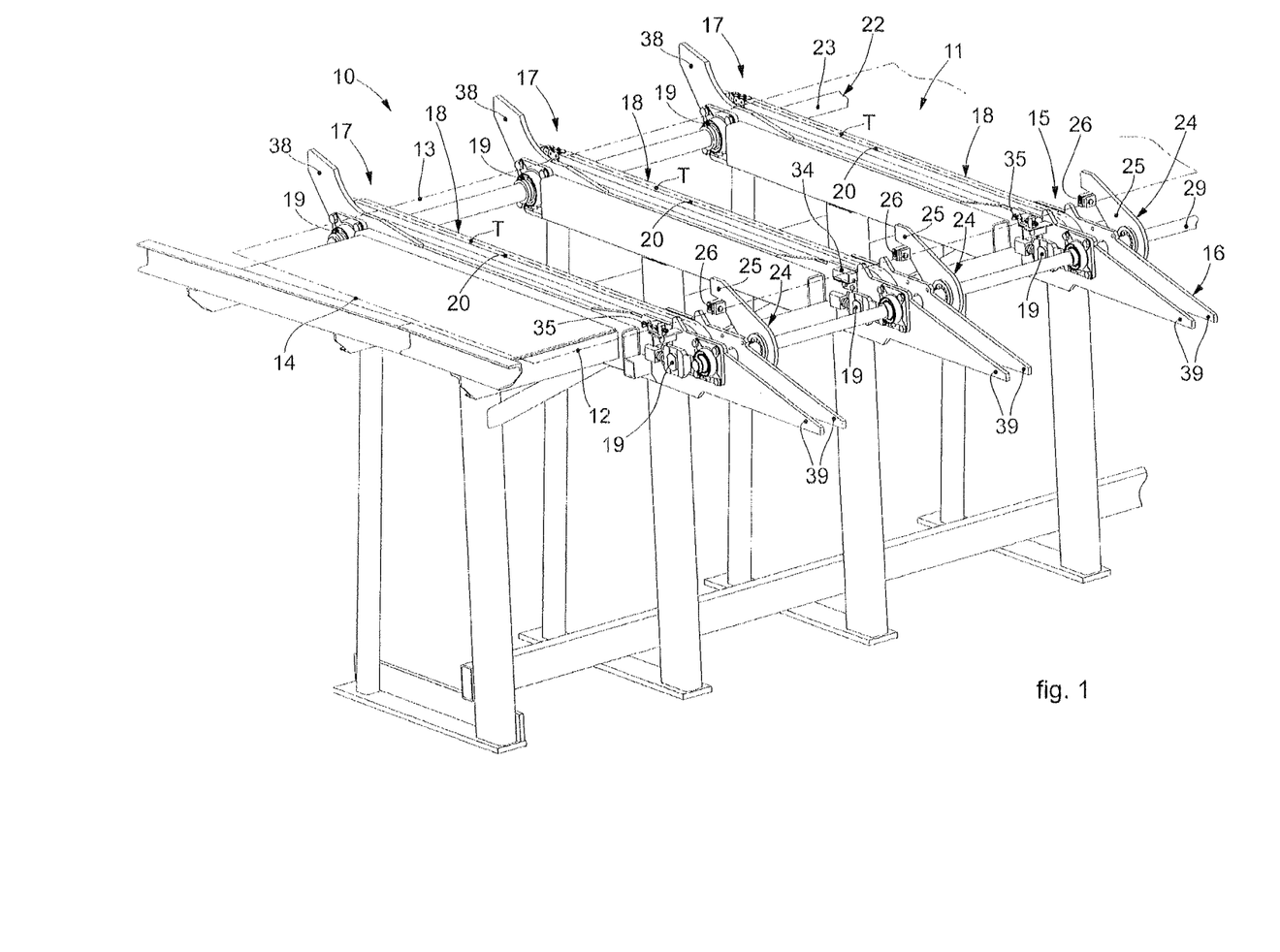
FIG. 1 is a partial perspective view of a handling apparatus for oblong products.

The support plane 11 is provided with a first longitudinal edge 12, a second longitudinal edge 13 opposite the first longitudinal edge 12 and two lateral edges 14, only one of the two visible in FIG. 1, interposed between the first longitudinal edge 12 and the second longitudinal edge 13.

The support plane 11 can be positioned horizontal to prevent the metal products P from moving in an unwanted manner due to gravity.

The first longitudinal edge 12 and the second longitudinal edge 13 have a length substantially equal to, or greater than, the length of the metal products P to be processed. The metal products P are loaded on the support plane 11 substantially parallel to the first longitudinal edge 12 and the second longitudinal edge 13.

The support plane 11 can be provided with a pick-up zone 15 in correspondence with which the metal products P are picked up in the manner described below, to be delivered in a delivery zone 16 located downstream of the support plane 11.

According to a possible solution, the pick-up zone 15 is positioned in correspondence with the first longitudinal edge 12 of the support plane 11.

According to one aspect of the present invention, movement devices 17 are associated with the support plane 11 and are configured to uniformly distribute the metal products P on the support plane 11 and move them toward the pick-up zone 15. The movement devices 17 are configured to move the metal products P parallel to each other.

The movement devices 17 are positioned on the support plane 11 distanced from each other along the extension in length of the support plane 11 and each of them acts on a portion of the metal products P to determine the movement of each of the metal products P.

In particular, the metal products P, in a bundle, can be unloaded onto the support plane 11 and, thanks to the presence of the movement devices 17, can be uniformly distributed on the latter, preventing them from reciprocal overlapping or twisting which would compromise the subsequent picking up of the metal product P.

According to a possible solution, each movement device 17 has an oblong development in a transverse direction T, which is located transversely, advantageously orthogonally, to the oblong development of the first longitudinal edge 12 of the support plane 11.

In particular, it can be provided that each movement device 17 has a first end located in correspondence with the first longitudinal edge 12 and a second end located in correspondence with the second longitudinal edge 13.

In this way, the movement devices 17 are able to receive all the metal products P disposed on the support plane 11.

According to possible embodiments of the present invention, each movement device 17 comprises a transmission member 18 selectively movable in a closed ring around return members 19.

The transmission member 18 defines, between the return members 19, return segments 20, at least one of which lies on the support plane 11 and is disposed in the transverse direction T.

In particular, it can be provided that the return segment 20 of the return members 19 has at least one support surface, facing outward and lying on the support plane 11. Each return segment 20 of the transmission members 18 is put in contact with a portion of the metal products P, thus terminating the distribution and movement of the metal products P on the support plane 11.

According to a possible solution, the return segments 20 can themselves define the support plane 11, in correspondence with which the metal products P are supported.

According to possible embodiments of the present invention, the transmission member 18 can be chosen from a group comprising at least one of either a chain, a belt or a cable.

According to the embodiment shown in FIG. 1, the transmission members 18 comprise a chain, for example of the roller type. Thanks to the irregularity of the support surface defined by the meshes that make up the chain, the choice of a roller chain allows to generate vibrations on the metal products P such as to cause homogeneous distribution of the latter on the support plane 11.

Figure 4:
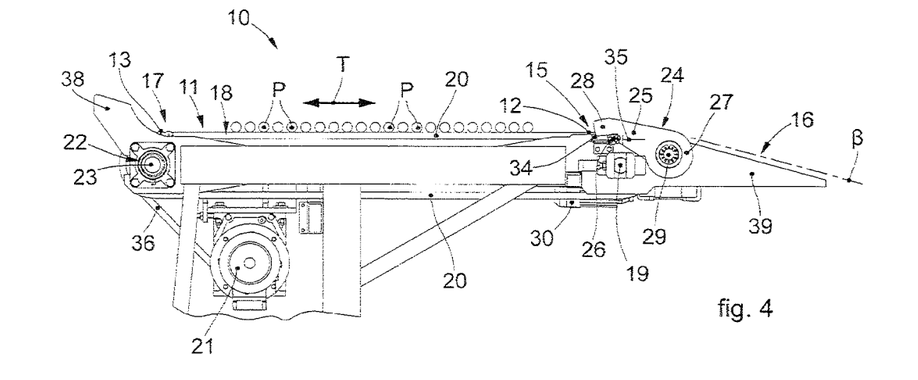
Figure 5:
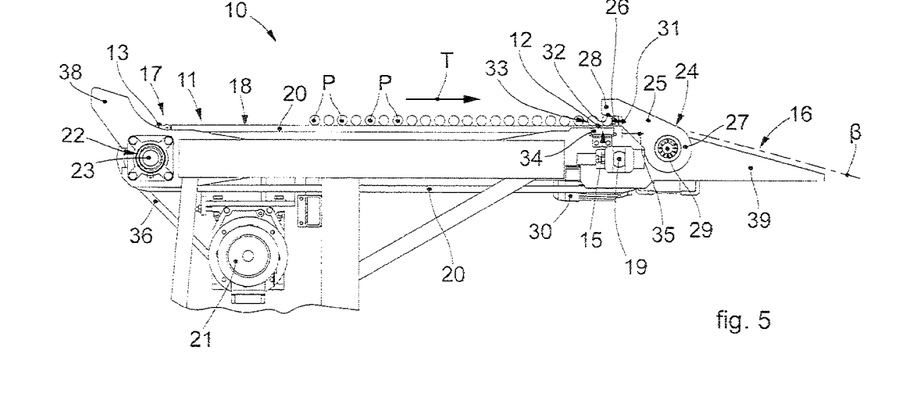
Figure 6:
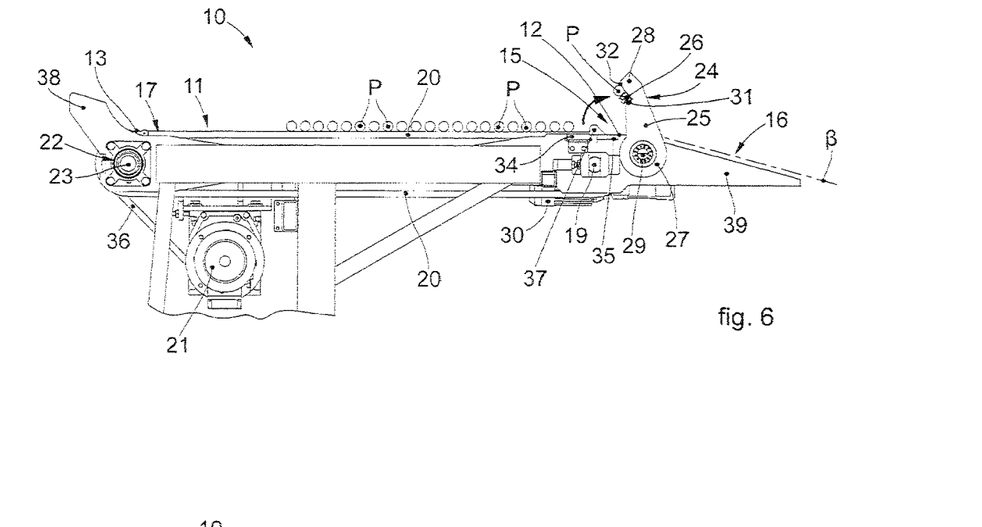
Figure 7:
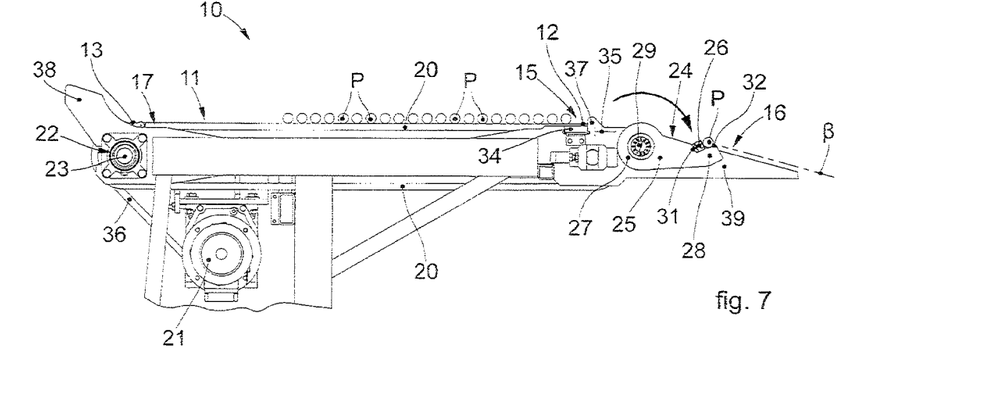

The roller chain, during its movement in the transverse direction T, induces an oscillation of the metal products P which are released from each other and are distributed one adjacent to the other on the support plane 11 as shown in FIGS. 4 and 5.

The return members 19 can comprise at least one of either wheels, pulleys, toothed crowns, suitable to allow to wind the transmission member 18 around them.

According to possible solutions, the return members 19 comprise toothed crowns, not visible in the drawings, on which the meshes of the roller chains engage. This solution ensures that there is no reciprocal sliding of the return members 19 and the transmission members 18.

According to a possible solution, shown in FIGS. 3-7, the movement devices 17 are connected to a drive member 21 configured to drive the movement devices 17.

According to the solution shown in FIGS. 1 and 3-7, the drive member 21 can be connected to synchronization devices 22 configured to synchronize the movement of all the movement devices 17, thus obtaining a uniform, parallel translation of the metal products P in the transverse direction T.

According to the solution shown in FIGS. 1 and 3-7, the synchronization devices 22 comprise a transmission shaft 23 connected kinematically with the drive member 21 and with the movement devices 17. By driving the drive member 21, the transmission shaft 23 is made to rotate around its axis, determining the simultaneous synchronized drive of all the movement devices 17.

According to the solution shown in FIGS. 1 and 3-7, one of the return members 19 of each movement device 17 is keyed onto the transmission shaft 23 and is made to rotate solidly with the latter.

The transmission shaft 23 can be connected to the drive member 21 with transmission components 36 such as chains, belts, gears, cables.

The transmission shaft 23 can extend longitudinally substantially for the entire length of the support plane 11 and be disposed parallel to the first longitudinal edge 12. In the solution shown in FIGS. 1 and 3-7 the transmission shaft 23 is positioned in correspondence with the second longitudinal edge 13 of the support plane 11.

The transmission shaft 23 can be put substantially on the same plane as the support plane 11, thus substantially limiting the overall bulk of the handling apparatus.

According to a further aspect of the invention, the handling apparatus 10 comprises handling devices 24 configured to pick up, on each occasion, a metal product P from the pick-up zone 15 of the support plane 11 and deliver it to a delivery zone 16.

Figure 2:
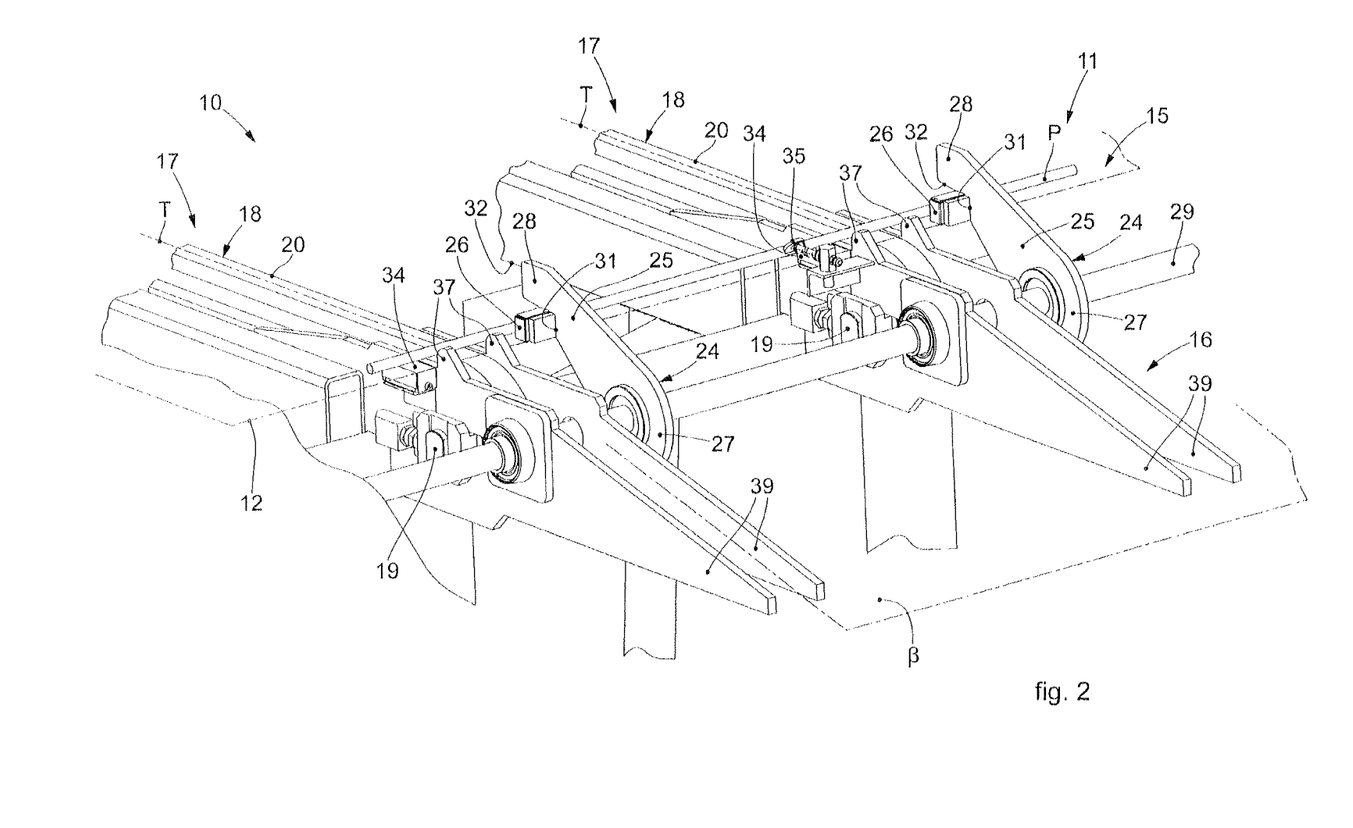
FIG. 2 is an enlarged detail of FIG. 1.

According to the solution shown in FIGS. 1 and 2, the handling devices 24 are reciprocally distanced along the longitudinal development of the support plane 11.

In this way, the handling devices 24 each act on a predefined longitudinal portion of the metal product P supporting the latter along its entire length and preventing oscillations of the metal product P due to its own weight.

According to one aspect of the present invention, the handling devices 24 comprise a plurality of transfer arms 25 provided with magnetic holding elements 26 configured to magnetically hold one of the metal products P during its transfer between the pick-up zone 15 and the delivery zone 16.

The magnetic holding elements 26 can comprise, for example, permanent magnets. However, it is not excluded that in possible solutions the magnetic holding elements 26 can comprise electromagnets selectively activated by the induction of a magnetic field.

According to a further aspect of the invention, the transfer arms 25 are mobile alternately between the pick-up zone 15 and the delivery zone 16 and vice versa.

According to a possible solution of the invention (FIG. 2), each transfer arm 25 is provided with a first end 27 around which the transfer arm 25 is alternately made to rotate, and with a second end 28 with which the respective magnetic holding element 26 is associated.

The transfer arms 25 can be installed on a common rotation shaft 29 which is selectively rotatable to simultaneously move the transfer arms 25 from the pick-up zone 15 to the delivery zone 16 or vice versa.

In particular, the transfer arms 25 are keyed onto the rotation shaft 29 with their first end 27.

According to a possible solution, the rotation shaft 29 is connected to an actuation member 30 configured to make the rotation shaft 29 rotate around its axis, and with it the transfer arms 25.

The rotation shaft 29 allows to synchronize the movement of all the transfer arms 25 by moving the metal product P uniformly and without inducing deformations thereon.

According to the embodiments shown in FIGS. 1-7, the rotation shaft 29 is installed adjacent and parallel to the oblong development of the first longitudinal edge 12, and extends substantially for the entire length of the latter.

According to possible solutions of the present invention (FIG. 2), the second end 28 of the support arm 25 is provided with a housing seating 31 in which the respective magnetic holding element 26 is installed.

According to further embodiments of the invention, the second end 28 of each transfer arm 25 is provided with an abutment edge 32 facing toward the housing seating 31 and when the transfer arm 25 is located in the pick-up zone 15, facing the support plane 11 to define with the latter a reception cavity 33 (FIG. 5) for one of the metal products P received from the movement devices 17. The reception cavity 33 is thus defined by the abutment edge 32 and the pick-up zone 15.

In particular, in the condition where the transfer arm 25 is located in the pick-up zone 15, the reception cavity 33 has a substantially C-shaped configuration, delimited on the perimeter by the abutment edge 32 and the housing seating 31.

The reception cavity 33 is open at the front to receive a metal product P which is moved in the transverse direction T.

In particular, it can be provided that, in the condition where the transfer arm 25 is located in the pick-up zone 15, the abutment edge 32 and the support plane 11 are reciprocally distanced from each other by a distance substantially equal to or greater than the diameter, or equivalent diameter, of the metal product P.

Merely by way of example, it can be provided that the distance between the abutment edge 32 and the support plane 11 can be greater than or equal to the diameter or equivalent diameter of the metal product but is less than twice the diameter or equivalent diameter of the metal product.

This solution prevents two or more overlapping metal products P from being positioned in the reception cavity 33, which would compromise the transfer of the metal products P as separate elements.

To respect this positioning distance, it is possible to provide an appropriate control of the positioning of the transfer arms 25, for example by acting, with an electronic controller, on the actuation member 30 of the rotation shaft 29.

The particular conformation of the transfer arms 25, as well as their actuation, ensures that the magnetic holding elements 26 receive and grip only one product at a time. Furthermore, the metal products P, fed to the transfer arms 25 by the movement devices 17, are always kept aligned and thus the metal products are prevented from overlapping when thrust by the movement devices 17.

According to variant embodiments, to control the positioning distance, it can be provided that end-of-travel devices or abutment elements are associated with the support plane 11, and are adjustable according to the size of the metal product P to be processed.

The combination of the positioning of the magnetic holding element 26 in the housing seating 31 and the particular C-shaped configuration of the reception cavity 33 ensures that each magnetic holding element 26 receives and holds only one metal product P at a time, thus preventing an uncontrolled transfer of several metal products P at a time.

According to a further embodiment of the invention, in the pick-up zone 15 the support plane 11 is provided with at least one magnetic body 34, in this case a plurality of magnetic holding bodies 34 configured to hold at least one of the metal products P adherent on the support plane 11.

In particular, it can be provided that each reception cavity 33 is defined by the magnetic holding element 26, the magnetic body 34, and the abutment edge 32 facing toward the pick-up zone 15.

When the metal products P are moved toward the pick-up zone 15, the holding action of the magnetic bodies 34 prevents overlapping of the metal products P and allows to accompany one of the metal products P into the reception cavity 33 to be subsequently held by the magnetic holding elements 26.

Between the magnetic bodies 34 and the magnetic holding elements 26 there is, therefore, a holding synergy of the metal products P such as to ensure that a single metal product is attached to the magnetic holding elements 26 at a time, thus allowing a correct counting and a correct supply.

Furthermore, it can be provided that the magnetic attraction force exerted by the magnetic holding elements 26 is greater than the magnetic attraction force exerted by the magnetic bodies 34.

This ensures that the magnetic holding elements 26 are able to hold and move only the metal product P which is in direct contact with them. The metal products P which are not in direct contact with the magnetic holding elements 26 are held by the magnetic bodies 34, preventing them from moving due to the displacement of the transfer arms 25.

Each magnetic body 34 can be located in correspondence with the first longitudinal edge 12 of the support plane 11 and close to each transfer arm 25, at least when the latter is in the pick-up zone 15.

According to possible solutions, detection devices 35 are installed in the pick-up zone 15, configured to detect the presence of one of the metal products P in contact with the magnetic holding elements 26.

In particular, it can be provided that in correspondence with each transfer arm 25, when the latter is in the pick-up zone 15, one of the detection devices 35 is provided to detect the certain contact of the metal product P with the magnetic holding element 26.

A control and command unit, not shown in the drawings, can be electrically connected at least to the detection devices 35 and the actuation members 30 and is configured to command the activation of the handling devices 24, to move the metal product P from the pick-up zone 15 to the delivery zone 16 only when all the detection devices 35 detect the presence of the metal product P in contact with the respective magnetic holding element 26. This prevents, during the transfer of the metal product P from the pick-up zone 15 to the delivery zone 16, there being any loss of grip, or a segment of the metal product P not being gripped, by the handling devices 24.

According to possible variant embodiments, it can be provided that the control and command unit, depending on the data detected by the detection devices 35, is able to recognize a different length of the metal product P being processed. The values of length of the metal products P can also be set by the user to command the correct functioning of the apparatus.

According to possible solutions, the second longitudinal edge 13 can be provided with abutment elements 38 protruding in an orthogonal direction to the support plane 11 and suitable to prevent the metal products P from involuntarily escaping from the support plane 11.

According to a possible solution, the second longitudinal edge 13 can be provided with at least one respective abutment element 38, in this case a plurality of abutment elements 38 also configured to prevent the metal products P from unintentionally escaping from the support plane 11.

The abutment elements 38 protrude transversely with respect to the support plane 11, defining an abutment to the movement of the metal products P.

The abutment elements 38 can be defined by brackets with a curved development and having a concavity which is directly facing toward the support plane 11.

In this way, when the movement devices 17 move the metal products P toward the abutment elements 38, a mixing action of the metal products P unloaded on the support plane 11 is obtained, which allows to reduce the entanglement normally present in the bundle of metal products.

The delivery zone 16 is laterally adjacent to the pick-up zone 15 of the support plane 11.

According to a possible solution of the present invention, the delivery zone 16 defines a delivery plane β inclined downward with respect to the support plane 11. In this way, when the metal product P is delivered to the delivery zone 16, it is unloaded, by gravity, to the work machine, not shown, which is usually located downstream of the delivery zone 16.

According to a possible solution of the invention, the delivery zone 16 can comprise a plurality of support brackets 39 distanced from each other along the longitudinal development of the first longitudinal edge 12.

Each support bracket 39 can be configured as an inclined plane and can be provided with a support surface suitable to support a portion of the metal product P.

The support brackets 39 extend, in the case shown here, substantially parallel to the transverse direction T.

The support brackets 39 can be laterally adjacent to the transfer arms 25, at least when the latter are positioned in the delivery zone 16.

According to a possible solution of the invention, the transfer arms 25 are rotatable from a condition in which they are substantially parallel to the support plane 11 to a condition in which they are disposed retracted, at least partly below the delivery plane β.

In the delivery condition of the transfer arms 25, the magnetic holding elements 26 are retracted below the delivery plane β.

This condition allows to separate the metal products P from the magnetic holding elements 26 once the transfer arms 25 are located in the delivery zone 16 thanks to the reciprocal interference that is generated between the support brackets 39 and the metal products P.

According to variant embodiments of the invention, not shown in the drawings, the delivery plane β can be defined by a substantially flat surface, provided with slits through which, during the movement of the transfer arms 25, the latter are positioned through.

According to possible embodiments of the present invention, the handling apparatus 10 comprises at least one control and command unit, not shown in the drawings and connected to at least the movement devices 17 and the handling devices 24, and configured to synchronize the reciprocal movement of the latter depending on the time sequence of operations to be carried out for the transfer of the metal products P.

With reference to FIGS. 3-7, we will now describe a possible operating sequence of the functioning of the handling apparatus 10 for metal products P.

Figure 3:
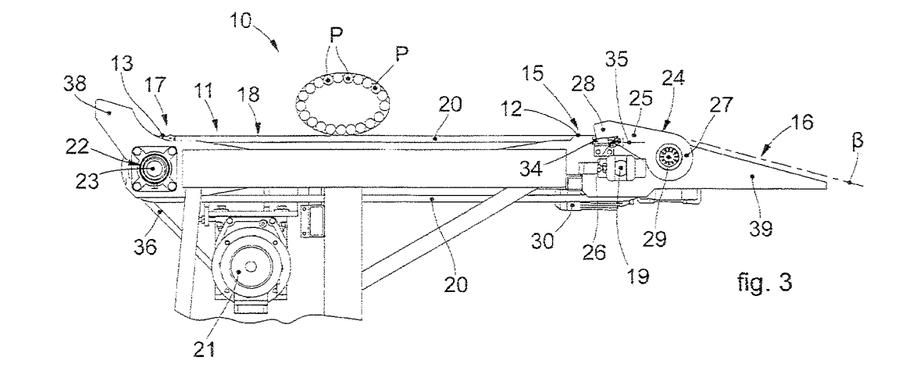
FIGS. 3-7 show some operating steps of a handling apparatus for oblong products in accordance with the present invention.

With reference to FIG. 3, it is provided to deposit a bundle of metal products P on the support plane 11.

A further step is provided in which the metal products P are distributed uniformly on the support plane 11, preventing any reciprocal overlapping.

In particular, during this step, it is provided to drive the movement devices 17 alternately in a first sense and a second sense, opposite the first, in the transverse direction T.

It is obvious to the person of skill that the movement speed of the movement devices 17 must be such as to induce on the metal products P inertia stresses such as to ensure they are moved and distributed uniformly.

In this way, by exploiting the inertia of the metal products P themselves, the latter are subjected to oscillations that tend to homogenize their position on the support plane 11.

In this operating condition, the second end 28 of the transfer arms 25 is positioned facing toward the metal products P and toward the second longitudinal edge 13.

The second end 28 of the transfer arms 25 is also positioned partly retracted below the support plane 11, in order to prevent the metal products P being attracted by the magnetic holding elements 26 during this step.

In this step, in fact, the reception cavity 33 is occluded at the front, preventing the introduction therein of metal products P.

Subsequently, it is provided to move the handling devices 24 into a pick-up condition, that is, the transfer arms 25 are positioned to define the reception cavity 33, which is open at the front to receive the metal product P.

In this condition (FIG. 5), the movement devices 17 are moved in the transverse direction T and toward the pick-up zone 15 to introduce a metal product P into the reception cavity 33.

The first metal product P introduced into the reception cavity 33 is magnetically attracted by the magnetic holding elements 26, whereas subsequent metal products P located in the delivery zone 15 are held adherent to the support plane 11 by the magnetic bodies 34.

The transfer arms 25 are subsequently made to rotate to take the metal product P, gripped on the magnetic holding elements 26, from the pick-up zone 15 to the delivery zone 16.

The magnetic holding elements 26 exert, on the metal product P gripped, a magnetic force greater than that of the magnetic bodies 34, so as to allow detachment from the latter and subsequent transfer.

The other metal products P, located in the pick-up zone 15 and not in direct contact with the magnetic holding elements 26, remain adherent to the support plane 11 due to the magnetic holding action exerted by the magnetic bodies 34.

By making the transfer arms 25 rotate (FIG. 7), the metal product P gripped against the magnetic holding elements 26 is taken to the delivery zone 16.

The transfer arms 25 are put in a retracted condition with respect to the delivery plane β and the reciprocal interference that is generated between the metal product P and the support brackets 39 is such as to separate the metal product P from the magnetic holding elements 26.

The downward inclination of the delivery plane β allows to unload the metal product P due to gravity, which rolling along the inclined plane falls into a feed zone of the work machine located downstream.

Subsequently, the transfer arms 25 are rotated in the opposite direction to the previous one, to take the magnetic holding elements 26 in correspondence with the pick-up zone 15; in this operating condition the movement devices 17 are again driven to move the metal products P lying on the support plane 11 toward the reception cavity 33 which is defined between the transfer arms 25 and the support plane 11 as shown in FIG. 5. The driving of the movement devices 17 can provide to advance the metal products P by a predetermined pitch, until one of the latter has been inserted into the reception cavities 33 and has been gripped by the magnetic holding elements 26. The transfer operation of the metal product P then continues as described with reference to FIGS. 6 and 7.

The handling apparatus 10 and the handling method as described heretofore allow to pick up the metal products P separately, without inducing deformations, and to feed them to the downstream work machine.

It is clear that modifications and/or additions of parts can be made to the handling apparatus 10 and handling method for metal products P as described heretofore, without departing from the field and scope of the present invention.

It is also clear that, although the present invention has been described with reference to some specific examples, a person of skill in the art shall certainly be able to achieve many other equivalent form of handling apparatus 10 and handling method for metal products P, having the characteristics as set forth in the claims and hence all coming within the field of protection defined thereby.

The invention claimed is:

1. Handling apparatus comprising a support plane (11) configured to support a plurality of metal products (P) with an oblong development, and handling devices (24) configured to pick up a metal product (P) from a pick-up zone (15) of said support plane (11) and to deliver it to a delivery zone (16), movement devices (17) being associated with said support plane (11) configured to distribute said metal products (P) on said support plane (11) and to move them toward said pick-up zone (15), and said handling devices (24) comprising a plurality of transfer arms (25) each provided with a first end (27) around which the transfer arm (25) is made to alternately rotate, and with a second end (28) with which a respective magnetic holding element (26) is associated to magnetically hold one of said metal products (P), said transfer arms (25) being alternately mobile between said pick-up zone (15) and said delivery zone (16), wherein said support plane (11), in said pick-up zone (15), is provided with at least one magnetic body (34) configured to hold at least one of said metal products (P) adherent to said support plane (11), and in that said second end (28) of said transfer arm (25) is provided with a housing seating (31) in which said magnetic holding element (26) is installed, and with an abutment edge (32) facing toward said housing seating (31) and facing said support plane (11) when the transfer arm (25) is located in the pick-up zone (15), each abutment edge (32) defining with said pick-up zone (15) a respective reception cavity (33) for one of said metal products (P) received from said movement devices (17).

2. Apparatus as in claim 1, wherein each reception cavity (33) is defined by said magnetic holding element (26), by said magnetic body (34) and by said abutment edge (32) facing toward said pick-up zone (15).

3. Apparatus as in claim 1, wherein said support plane (11) is provided with a longitudinal edge (12) in which said pick-up zone (15) is provided, and in that said movement devices (17) are configured to move said metal products (P) toward said longitudinal edge (12).

4. Apparatus as in any claim hereinbefore, wherein each of said movement devices (17) has an oblong development in a transverse direction (T) located transverse to said longitudinal edge (12).

5. Apparatus as in claim 4, wherein each of said movement devices (17) comprises a transmission member (18), selectively movable in a closed ring around return members (19), said transmission member (18) defining return segments (20) and at least one of said return segments (20) lying on said support plane (11) and being disposed in said transverse direction (T).

6. Apparatus as in claim 5, wherein said transmission member (18) comprises at least one of either a chain, a belt or a cable.

7. Apparatus as in claim 1, wherein detection devices (35) are installed in said pick-up zone (15), configured to detect the presence of one of the metal products (P) in contact with said magnetic holding elements (26).

8. Apparatus as in claim 7, wherein it comprises a control and command unit connected at least to the detection devices (35) and to the actuation members (30) and configured to command the activation of said handling devices (24), in order to take said metal product (P) from said pick-up zone (15) to said delivery zone (16), only when all said detection devices (35) detect the presence of said metal product (P).

9. Method for handling metal products (P) which provides to dispose on a support plane (11) a plurality of metal products (P) with an oblong development and to pick up, with handling devices (24), a metal product (P) from a pick-up zone (15) of said support plane (11) and to deliver it to a delivery zone (16), wherein it provides a distribution of said metal products (P) on said support plane (11) and a subsequent movement of the metal products (P) toward said pick-up zone (15) with movement devices (17), wherein said pick-up provides to hold one of said metal products (P) magnetically against magnetic holding elements (26) associated with transfer arms (25) of said handling devices (24), and to move said transfer arms (25) alternately between the pick-up zone (15), to pick up one of said metal products (P), and the delivery zone (16), to deliver the metal product (P) picked up, said transfer arms (25) being made to rotate alternately around their first ends (27) and holding said metal product (P) in correspondence with second ends (28) of said transfer arms (25) where said magnetic holding elements (26) are associated, wherein when said metal products (P) are moved toward said pick-up zone (15) at least one magnetic body (34), provided in the latter, holds at least one of said metal products (P) adherent to the support plane (11), in that said second ends (28) of said transfer arm (25) are each provided with a housing seating (31) in which said magnetic holding elements (26) are installed, and with abutment edges (32) facing toward said housing seating (31), in that when said transfer arms (25) are located in the pick-up zone (15), said abutment edges (32) face said support plane (11) and define with said pick-up zone (15) respective reception cavities (33), and in that said movement devices (17) move said metal products (P) toward said pick-up zone (15) in order to introduce one of said metal products (P) into said reception cavity (33).

10. Method as in claim 9, wherein said distribution of the metal products (P) on the support plane (11) provides to move said movement devices (17) alternately in a first sense and a second sense, opposite the first sense, in a transverse direction (T) with respect to the oblong development of said metal products (P).

* * * * *